United States Patent
Lincke

(12) 
(10) Patent No.: US 6,627,074 B2
(45) Date of Patent: Sep. 30, 2003

(54) FILTER ELEMENT FOR SWIMMING POOL CLEANER

(75) Inventor: Steven L. Lincke, New Carlisle, IN (US)

(73) Assignee: Filter Specialists, Inc., Michigan City, IN (US)

( * ) Notice: Subject to any disclaimer, the term of this patent is extended or adjusted under 35 U.S.C. 154(b) by 0 days.

(21) Appl. No.: 10/060,073

(22) Filed: Jan. 29, 2002

(65) Prior Publication Data

US 2002/0104790 A1 Aug. 8, 2002

Related U.S. Application Data

(60) Provisional application No. 60/264,989, filed on Jan. 30, 2001.

(51) Int. Cl.$^7$ .............................. E04H 4/16; B01D 35/02
(52) U.S. Cl. ..................... 210/169; 210/232; 210/416.2; 15/1.7
(58) Field of Search ................................. 210/169, 232, 210/416.1, 416.2, 451, 452; 15/1.7

(56) References Cited

U.S. PATENT DOCUMENTS

| | | | | |
|---|---|---|---|---|
| 4,168,557 A | * | 9/1979 | Rasch et al. | 15/1.7 |
| 4,240,173 A | * | 12/1980 | Sherrill | 15/1.7 |
| 5,202,020 A | * | 4/1993 | Desjoyaux et al. | 210/169 |
| 5,337,434 A | * | 8/1994 | Erlich | 15/1.7 |
| 5,507,058 A | * | 4/1996 | Minami et al. | 15/1.7 |
| 5,882,512 A | * | 3/1999 | Denkewicz et al. | 210/169 |
| 6,409,916 B1 | * | 6/2002 | Zelas et al. | 210/169 |
| 2002/0129839 A1 | * | 9/2002 | Erlich et al. | 134/22.18 |

* cited by examiner

Primary Examiner—Fred Prince
(74) Attorney, Agent, or Firm—Botkin & Hall, LLP

(57) ABSTRACT

A filter element for a swimming pool cleaner includes a pair of pouches which are received within cavities defined within the pool cleaner housing. The outer edges of the filter element are attached to corresponding edges of the housing by releasable clips. Water is drawn through apertures in the bottom of the cleaner through the filter element and into a motor driven pump, with large debris remaining in the pouches and particles entrained in the pool water being caught by the filter element.

20 Claims, 5 Drawing Sheets

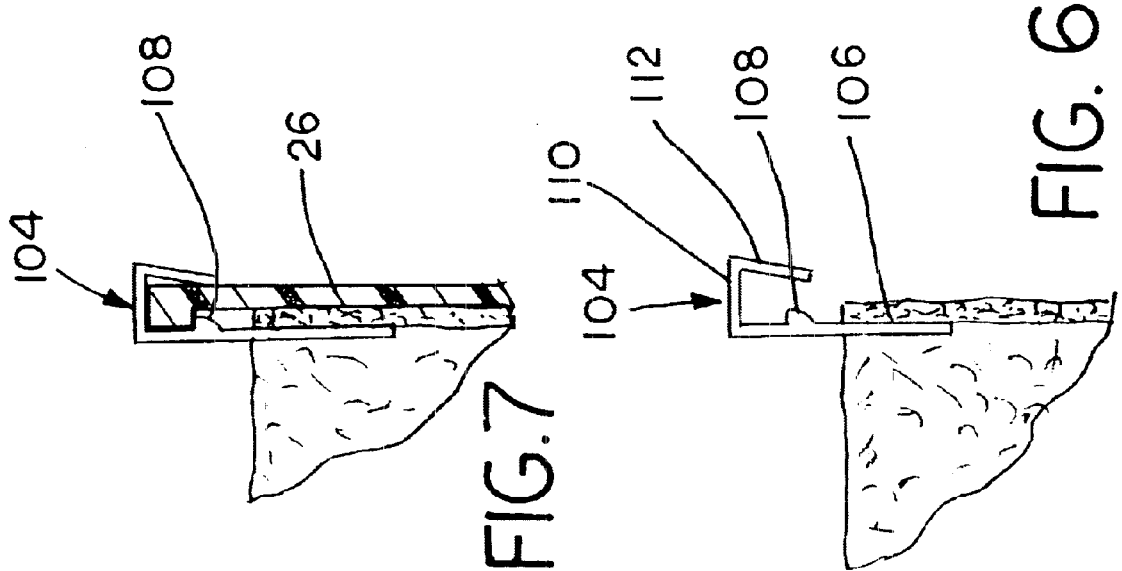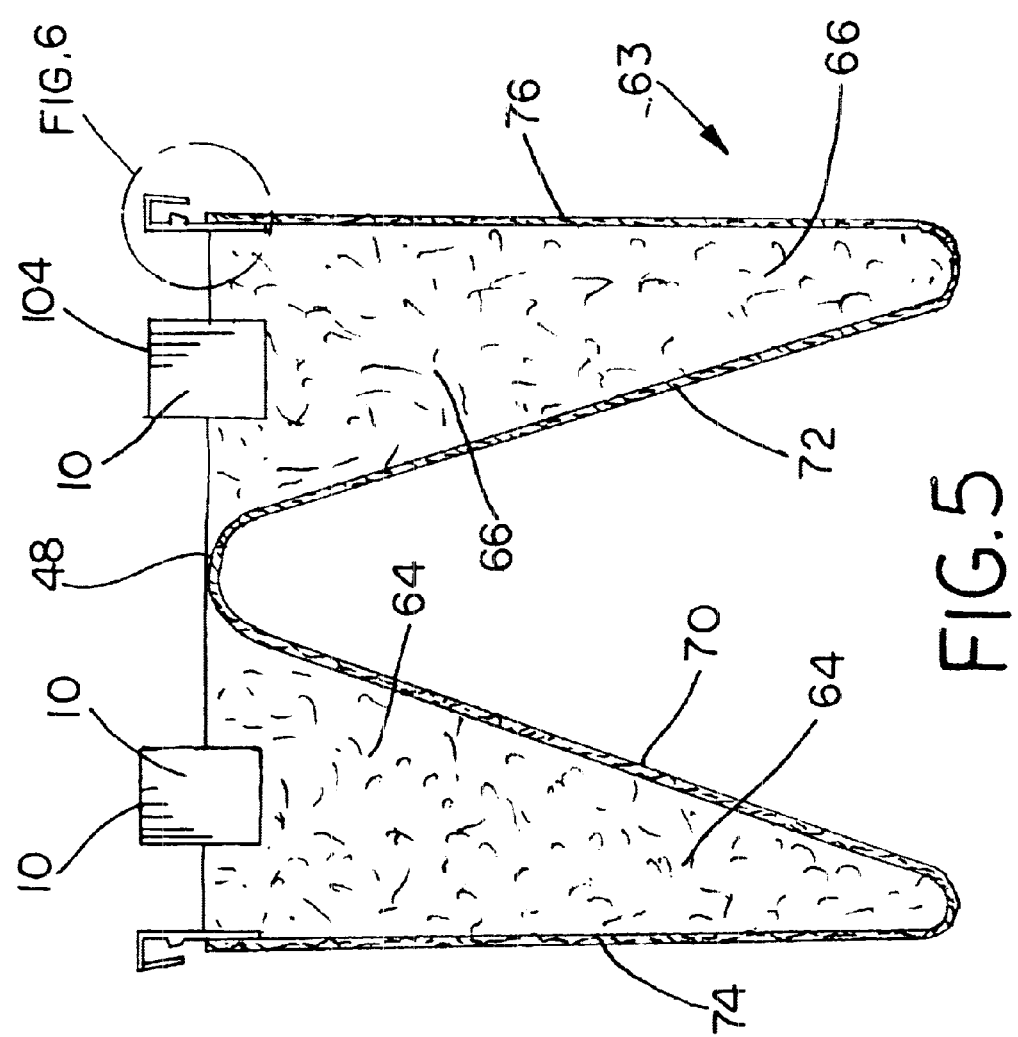

FILTER ELEMENT FOR SWIMMING POOL CLEANER

CROSS REFERENCE TO RELATED APPLICATION

This Application claims the benefit of Provisional Application Ser. No. 60/264,989, filed Jan. 30, 2001.

TECHNICAL FIELD

This invention relates to a replaceable filter element for a cleaner for removing debris from a swimming pool.

BACKGROUND OF THE INVENTION

All swimming pools require periodic cleaning, to remove debris which has collected on the bottom end and/or sidewalls of the swimming pool. One type of prior art swimming pool cleaner includes a housing containing a pump operated by an electric motor which is connected to a power supply through a line cord. The cleaner has openings or slots on the bottom thereof, through which water is sucked by the pump. Since the bottom of the cleaner is very close to the wall of the swimming pool, debris collected on the bottom or sides of the swimming pools is entrained with the water, which passes through a filter. The filter collects the debris as the water is forced through the cleaner by the pump. Accordingly, the filter element must be replaced at regular intervals when particulate matter captured by the filter media significantly impedes flow through the cleaner. The filter element known in the prior art is complex and expensive, and is quite difficult to clean and/or change, and includes an elastic band which is engaged with an appropriate surface on the removable lid, and further requires support to hold the filter element in the required position.

SUMMARY OF THE INVENTION

According to the present invention, a filter element is formed from a relatively inexpensive non-woven material which captures particles throughout the depth of the filter element. The filter element includes a pair of pouches which are received in corresponding cavities defined between the outer wall of the housing and a perforated frame which encloses the pump and motor. The filter element is held in place by inexpensive clips which secure the edges of the pouches to the housing, thereby eliminating the elastic bands and wire supports necessary in prior art devices. Accordingly, large debris are captured in the pouches and particulate matter entrained in the water pumped through the filter element is captured throughout the thickness of the filter element. If it is not necessary to remove the relatively small particulate matter, the filter element may be made of a mesh material to separate the larger debris from the water and retain it in the pouches.

BRIEF DESCRIPTION OF THE DRAWINGS

FIG. 5 is. a view taken substantially along lines 5—5 of FIG. 4;

FIG. 6 is a detailed view of the circumscribed portion of FIG. 5;

FIG. 7 is a view similar to FIG. 6, but illustrating the manner in which the filter element is secured to the housing of the swimming pool cleaner.

DETAILED DESCRIPTION

Figure 1:
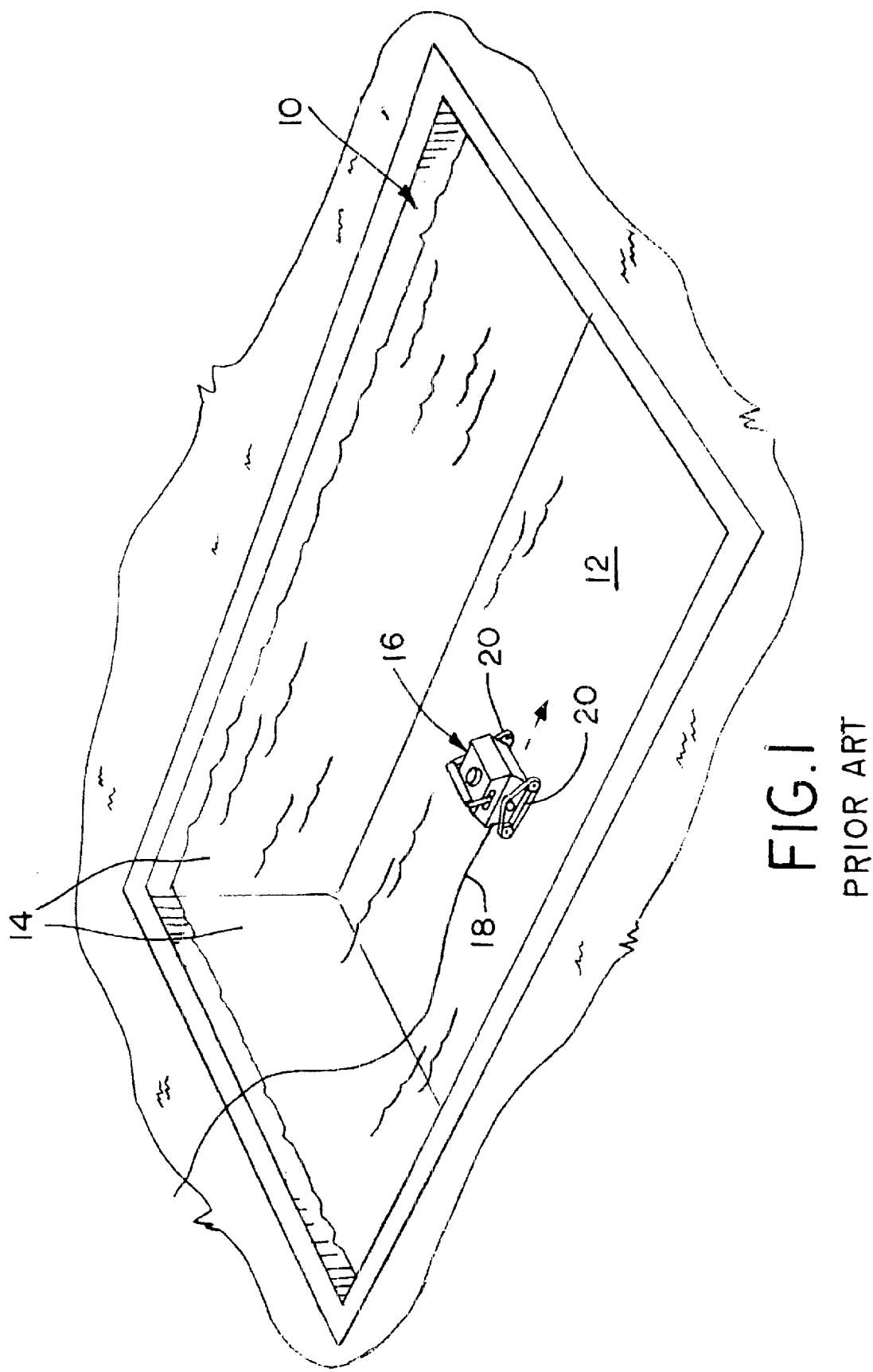
FIG. 1 is a schematic illustration of a swimming pool and a pool cleaning apparatus incorporating a filter element made pursuant to the teachings of the present invention the cleaner being illustrated as cleaning the bottom of the swimming pool.
Figure 2:
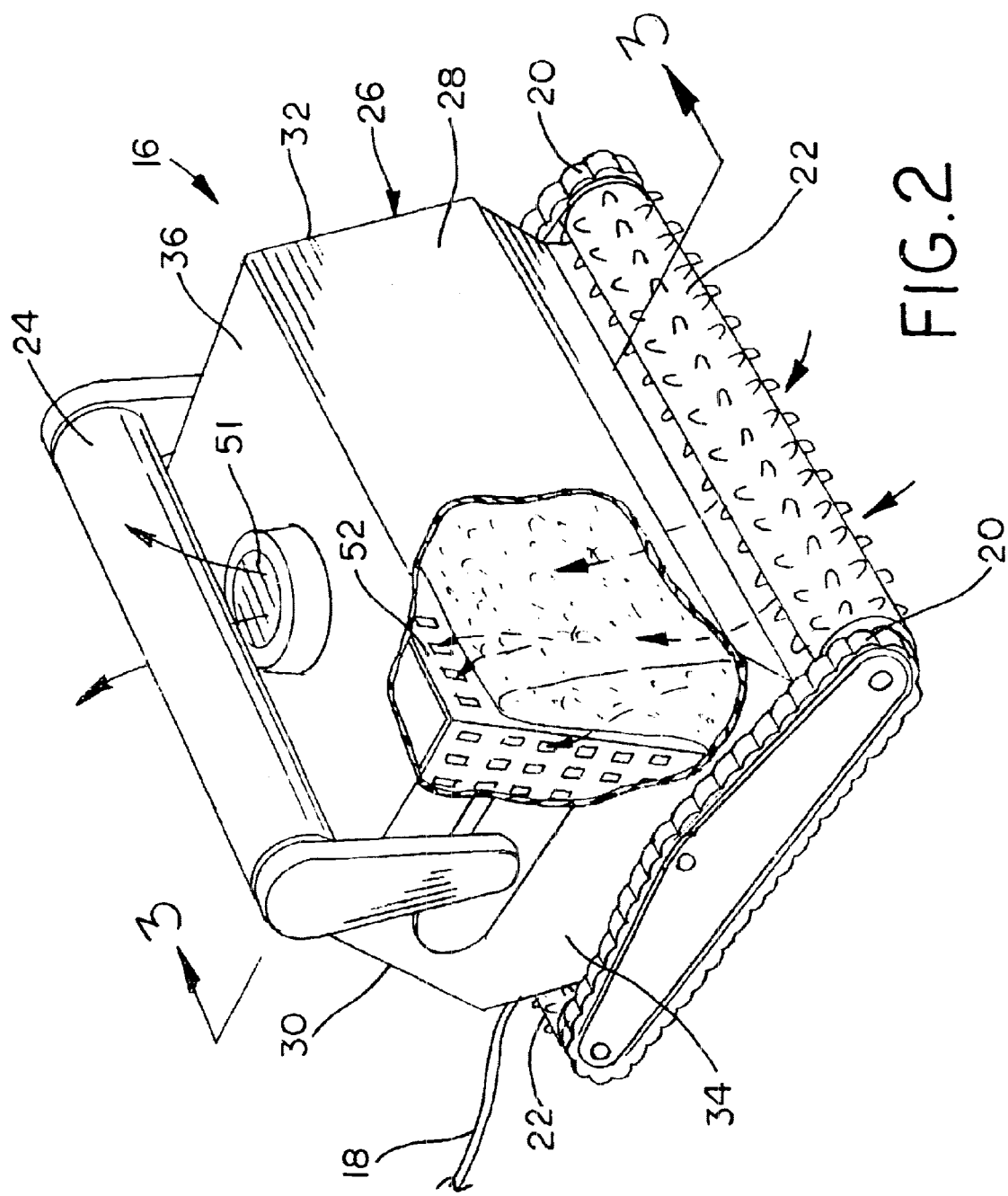
FIG. 2 is view and perspective of the pool cleaner illustrated in FIG. 1.

Referring now to the drawings, a swimming pool generally indicated by the numeral 10 includes a bottom wall 12 and sidewalls 14. A pool cleaning mechanism generally indicated by the numeral 16 is shown traversing the bottom wall 12, and is powered by an electric motor (not shown) connected to an appropriate source of electricity by power cord 18. The pool cleaner 16 is commercially available, and is designed to traversing the bottom wall 12 in a random fashion and is similarly equipped with tracks indicated at 20 that powers the unit along the bottom wall 12 and also allows it to climb the sidewalls 14, thereby effecting cleaning of the surfaces of the pool 10. Tracks 20 are powered by the aforementioned electric motor and also rotate exterior rollers 22, which cause the cleaner 16 to adhere to the sidewalls 14 when climbing the latter. A float 24 permits the cleaner 16 to release from the sidewalls when it approaches the upper surface of the water in the pool, all in the manner well known to those skilled in the art.

Pool cleaner 16 further includes housing 26 defined by sidewalls 28, 30, 32, 34 and top wall 36. The sidewalls 28, 30, 32, 34 terminate in an outer edge 38 which defines an opening closed by a removable lid 40. Lid 40 is provided with passages 42 each containing a check valve 44 which permits water to be drawn into the interior of the housing 26 as will be hereinafter explained. A perforated frame generally indicated by the numeral 46 45 extends into the housing 26 from the upper wall 36 and defines a compartment 48 there within. An electric motor driven pump 50 is housed within the compartment 48 and discharges water from the housing 26 through a discharge port 51 in the upper wall 36. The perforated frame 46 45 includes sidewalls 52, 54 which extend between sidewalls 32, 34 of the housing 26 and cooperate with sidewalls 28, 30 respectively to define cavities 56, 58 there between. The walls 52, 54 are connected by lower transverse wall 60. The sidewalls 52, 54 define apertures 62 which communicate the pump 50 with cavities 56, 58.

Figure 3:
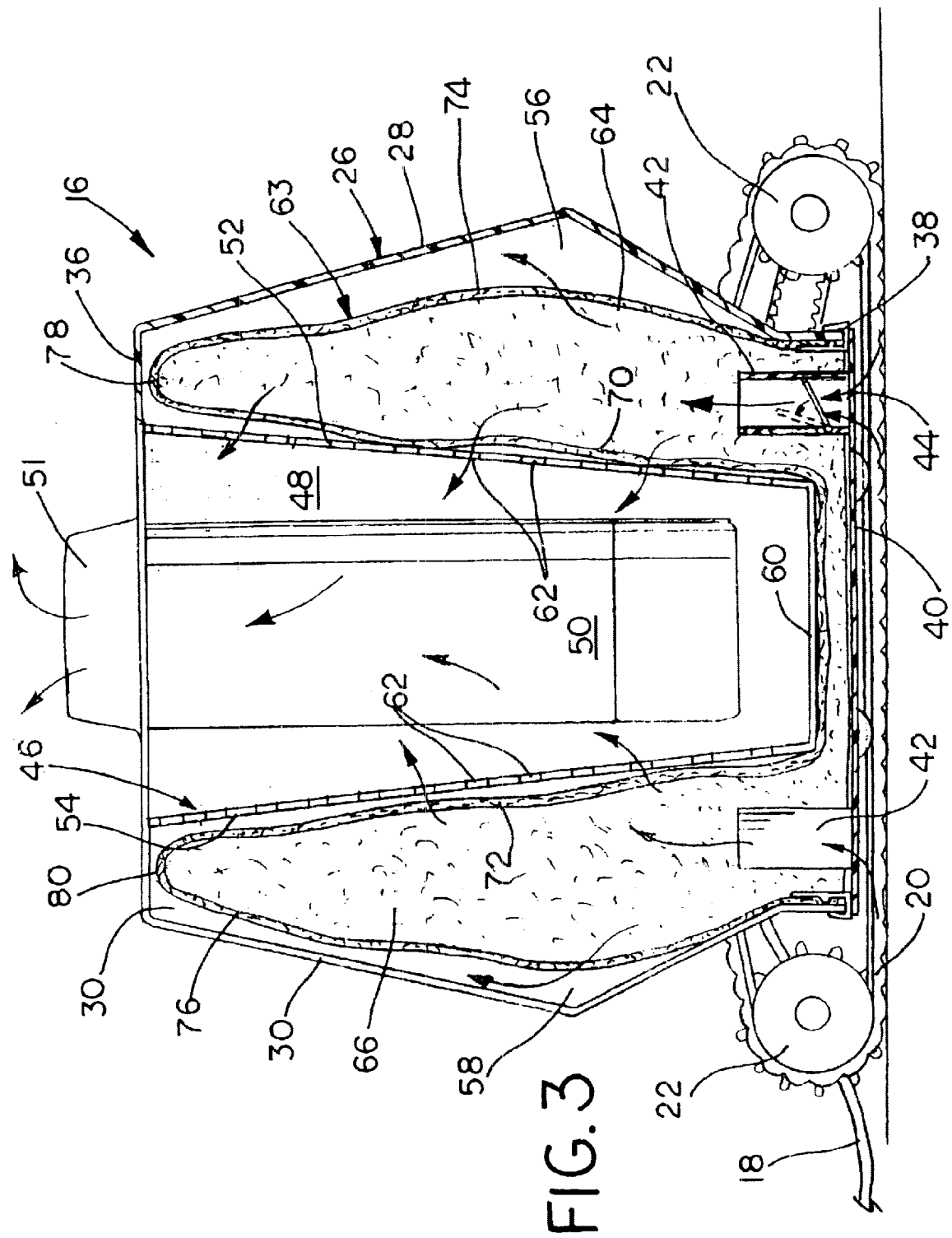
FIG. 3 is a cross-sectional view taken substantially along lines 3—3 of FIG. 2.
Figure 4:
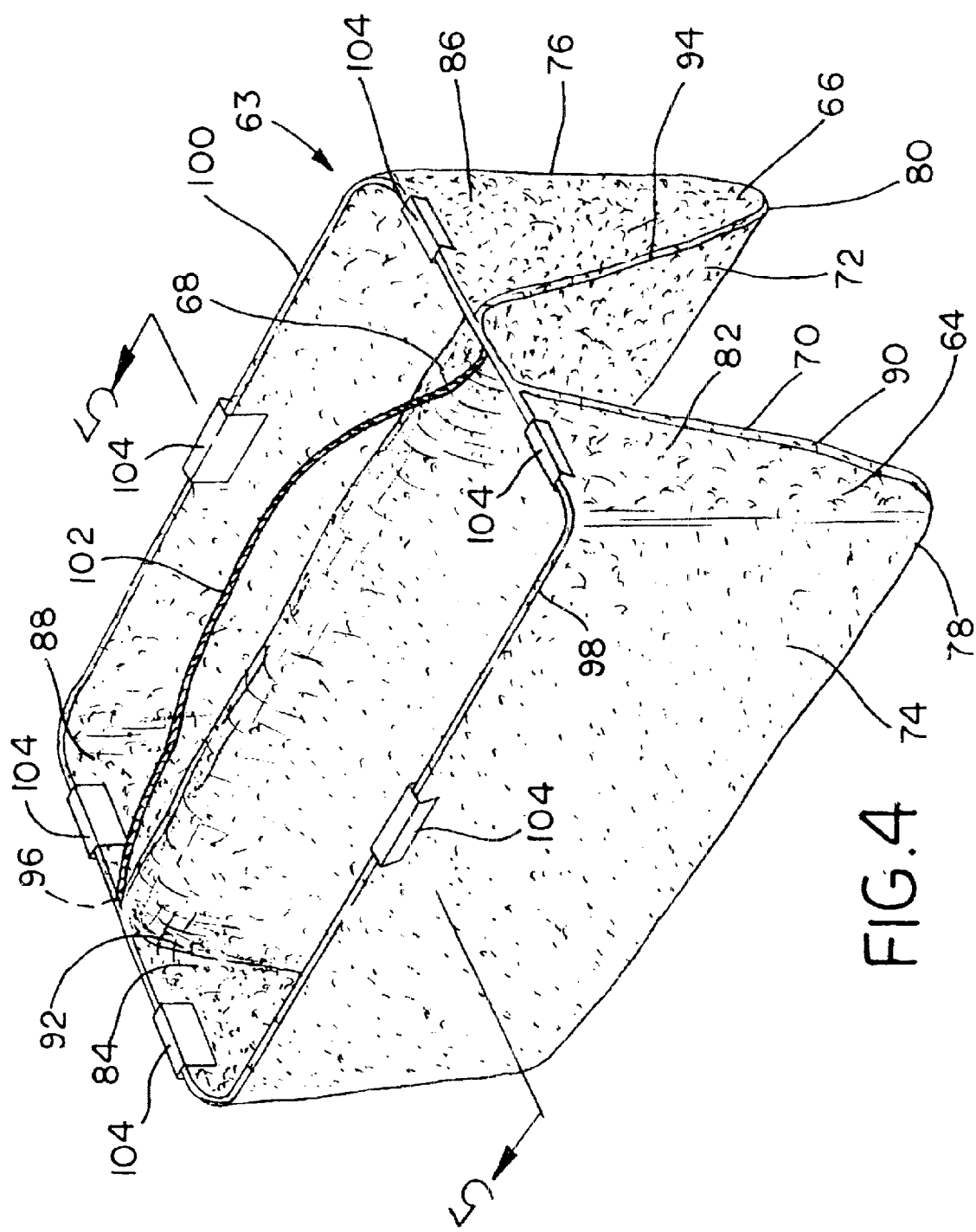
FIG. 4 is a view and perspective of a filter element made pursuant to the present invention, the filter element being illustrated in FIG. 4 inverted from its position illustrated in FIGS. 2 and 3.

A filter elements, generally indicated by the numeral 63, is made from a flat sheet of a non-woven fabric consisting of randomly arrayed polypropylene fibers which are processed in a manner that is well known to those skilled in the art to form a shape retaining batt that is sufficiently porous to permit the flow of water there through. The non-woven fabric captures particles entrained in the water through the depth of the batt. The filter element 63 is formed from the batt to include pouches 64, 66 which are inter-connected by a bridging portion 68. As can be seen in FIG. 3, when the filter element 63 is installed in the housing 26, the pouch 64 extends into the cavity 56 and pouch 66 extends within the cavity 58. The filter element 63 including pouches 64, 66 is defined by a pair of overlapping panels of non-woven fabric consisting of inner panels 70, 72 which face the walls 52, 54 of the perforated frame 46 when the filter element is installed in the housing 26 and each of which terminate in the bridging portion 68 48 which extends over to the transverse wall 60, and a pair of outer panels 74, 76 which face the sidewalls 28, 30 of the housing 26. The outer panels 74, 76 are connected to the inner panels 70, 72 by a folded edge 78, 80 and further include folded over side panel portions 82, 84 and 86, 88. Side panel portions 82, 84 are seamed to the panel 70 at 90 and 92 to form the pouch 64, and the side panel portions 86 and 88 are seamed to inner panel 72 at 94 and 96 to form the pouch 66. The outer panel 74 and side panels 82, 84 terminate in an attaching edge 98, which cooperates with inner panel 70 and bridging portion 68 to define an opening into the pouch 64. Similarly, panel 76 and side panel portions 86 and 88 terminate in an attaching edge 100, which cooperates with bridging portion 68 and inner panel 72 to define an opening into the pouch 66. Opposite ends of cording 102 are secured to opposite ends of the bridging portion 68, to provide a handle which facilitates removal of the filter element 63 from the housing 26 when the filter element is changed. Optionally, the filter element 63 may be made of mesh fabric to remove only large debris from the pool water.

Clips 104 are provided on the outer panel 74, 76 and edge panels portions 82, 84, 86, 88 for securing the filter element 63 to the housing 26. The clips 104 are made of a resilient or semi-resilient material, such as plastic, and, as can best be seen in FIG. 6, include a leg 106 which extends along the inner surface of a corresponding panel 74, 76 or 82, 84, 86, 88 and is secured thereto by, for example, sewing or by an. appropriate adhesive. The clips 104 further includes a transverse portion 110 which extends across the outer attaching edge 98 or 100 and also across the outer edge 38 of the walls 28, 30, 32, 34 when the filter element 63 is installed within the housing 26. The clips 104 terminate in a hook 112 that tapers toward leg 106 to thereby retain by friction the filter element 63 to the housing 26 when the filter element is installed in the housing. The attaching edge defines a rim 107 which is engaged by a barb 108 which extends from leg 106 of each clip 104 to permit the clips 104 to secure the filter element 63 62 to the housing. The clips 104 are sufficiently flexible to permit them to be manually removed from the housing.

When the filter element 63 is to be installed in the housing 26, housing 26 is inverted and the lid 40 removed. The old filter element is removed from the housing by pulling on the cord 102. A new filter element 63 is installed in the housing 26 by arranging the pouches 64, 66 in their corresponding cavities 56, 58 and by then attaching the clips 104 over the outer edge 38 of the sidewalls 28, 30, 32, 34. The lid 40 can then be reinstalled, and the cleaner 16 is then ready for use. In use, operation of the pump 50 causes water from the swimming pools to be drawn in through the passages 42, and since these passages are relatively close to the wall of the pool 10, the debris that is accumulated on the walls will be drawn through the passages 42 and into the pouches 64, 66. Large debris will remain in the pouches, as the pool water with smaller debris entrained therein will be drawn through the fluid permeable panels of the pouches and into the cavities 56, 58 and then through apertures 62 of the perforated frame 46, with smaller particles entrained in the swimming pool water being caught and captured within the filter media comprising the filter element 62, in a manner well known to those skilled in the art. Water is then discharged back into the pool through discharge opening 51.

What is claimed is:

1. Filter element for swimming pool cleaner having a housing having an outer edge defining an opening into said housing and a perforated frame within said housing and cooperating with said housing to define a pair of cavities between the frame and said housing, said filter element being made of a water permeable fabric and comprising a pair of interconnected pouches, each of said pouches having an attaching edge defining an open end of each said pouch, each of said pouches being received within a corresponding one of said cavities when the filter element is installed in said housing, and releasable fasteners for releasably securing the attaching edges of said pouches to corresponding portions of the outer edge of said housing whereby upon release of said fasteners said filter element may be removed from said housing.

2. Filter element as claimed in claim 1, wherein said pouches are interconnected by a bridging portion that extends over said perforated frame when the pouches are within their corresponding cavities.

3. Filter element as claimed in claim 2, wherein opposite ends of cording are secured to opposite ends of said bridging portion to define a handle that may be grasped to remove the filter element from the housing.

4. Filter element as claimed in claim 1, wherein each of said pouches includes a folded edge opposite said attaching edge to define an inner panel engaging said perforated frame when the filter element is installed in said housing and an outer panel overlaying said inner panel to define inner and outer walls of said pouch, each of said inner and outer panels having a pair of side edges extending between the folded edge and the attaching edge, said side edges of said panels being joined together to form said pouch.

5. Filter element as claimed in claim 4, wherein said pouches are interconnected by a bridging portion that extends over said perforated frame when the pouches are within their corresponding cavities, said bridging portion extending from one of said inner panels to the other inner panel.

6. Filter element as claimed in claim 4, wherein said fabric is a non-woven fabric consisting of randomly arranged fibers.

7. Filter element as claimed in claim 4, wherein at least one of said panels of each pouch includes transversely extending portions on opposite sides thereof terminating at said seam to define side walls of said filter element, said attaching edge extending between said seams along said side walls and said outer wall.

8. Filter element as claimed in claim 7, wherein said housing terminates in an outer edge and said fasteners are clips carried by said outer panel, said clips including hooked portions extending over the outer edge of said housing and clasping said housing to secure said filter element to said housing.

9. Filter element as claimed in claim 8, wherein said clips are mounted on both said side walls and said outer wall of each of said pouches.

10. Filter element as claimed in claim 1, wherein said housing terminates in an outer edge and said fasteners are clips secured to said outer panel, said clips including hooked portions extending over the outer edge of said housing and clasping said housing to secure said filter element to said housing.

11. Filter element as claimed in claim 1, wherein each of said pouches includes a folded edge opposite said attaching edge to define a pair of overlaying panels defining said pouch, each of said overlaying panels having a pair of side edges extending between the folded edge and the attaching edge, said side edges of said panels being joined together along a seam to form said pouch.

12. Filter element for swimming pool cleaner comprising a water permeable fabric formed into a pair of pouches, each of said pouches being defined by a pair of overlapping panels including an inner panel facing the inner panel of the other pouch and an outer panel, said inner panels being interconnected by a bridging portion of said fabric, each of said outer panels having an attaching edge cooperating with the corresponding inner panel to define an open end of each said pouch, and releasable fasteners for releasably securing the attaching edges of said pouches to the swimming pool cleaner.

13. Filter element as claimed in claim 12, wherein at least one of said panels of each pouch includes transversely extending portions on opposite sides thereof terminating at a seam with the other of said panels to define side walls of said filter element, said attaching edge extending between said seams along said side walls and said outer wall.

14. Filter element as claimed in claim 13, wherein said housing terminates in an outer edge and said fasteners are clips carried by said outer panel, said clips including hooked portions extending over the outer edge of said housing and clasping said housing to secure said filter element to said housing.

15. Filter element as claimed in claim 14, wherein said clips are carried on both said side walls and said outer wall of each of said pouches.

16. Filter element as claimed in claim 15, wherein said clips are attached to said walls adjacent said attaching edge thereof and include a barb penetrating said filtering fabric.

17. Filter element as claimed in claim 12, wherein said fabric is a non-woven fabric consisting of randomly arranged fibers.

18. Filter element for swimming pool cleaner having a housing having an outer edge defining an opening into said housing closed by a removable lid and a perforated frame within said housing and cooperating with said housing to define a pair of cavities between the frame and said housing, said filter element being made of a water permeable fabric and comprising a pair of interconnected pouches, each of said pouches being defined by a pair of overlapping panels including an inner panel facing the perforated frame and an outer panel, said inner panels being interconnected by a bridging portion of said fabric extending over said frame when the filter element is installed in the housing, each of said outer panels having an attaching edge defining an open end of each said pouch facing said opening of the housing, each of said pouches being received within a corresponding one of said cavities when the filter element is installed in said housing, and releasable fasteners for releasably securing the attaching edges of said pouches to corresponding portions of the outer edge of said housing whereby upon release of said fasteners and removal of said lid said filter element may be removed from said housing.

19. Filter element as claimed in claim 18, wherein at least one of said panels of each pouch includes transversely extending portions on opposite sides thereof terminating at a seam with the other of said panels to define side walls of said filter element, said attaching edge extending between said seams along said side walls and said outer wall.

20. Filter element as claimed in claim 19, wherein said housing terminates in an outer edge and said fasteners are clips carried by said outer panel, said clips including hooked portions extending over the outer edge of said housing and clasping said housing to secure said filter element to said housing.

\* \* \* \* \*